(12) United States Patent
Katayama et al.

(10) Patent No.: US 9,512,881 B2
(45) Date of Patent: Dec. 6, 2016

(54) ROLLER BEARING AND SHAFT SUPPORT STRUCTURE

(71) Applicant: NTN CORPORATION, Osaka (JP)

(72) Inventors: Akihiko Katayama, Shizuoka (JP); Katsufumi Abe, Shizuoka (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 14/400,666

(22) PCT Filed: Apr. 23, 2013

(86) PCT No.: PCT/JP2013/061867
§ 371 (c)(1),
(2) Date: Nov. 12, 2014

(87) PCT Pub. No.: WO2013/175922
PCT Pub. Date: Nov. 28, 2013

(65) Prior Publication Data
US 2015/0131935 A1 May 14, 2015

(30) Foreign Application Priority Data
May 21, 2012 (JP) .................................. 2012-115520

(51) Int. Cl.
*F16C 33/46* (2006.01)
*F16C 33/56* (2006.01)
(Continued)

(52) U.S. Cl.
CPC ........... *F16C 33/4676* (2013.01); *F16C 19/26* (2013.01); *F16C 19/463* (2013.01); *F16C 19/466* (2013.01); *F16C 33/4635* (2013.01); *F16C 33/4652* (2013.01); *F16C 33/4694* (2013.01); *F16C 33/504* (2013.01); *F16C 33/588* (2013.01); *F16C 33/60* (2013.01); *F16C 43/04* (2013.01); *F16C 9/02* (2013.01); *F16C 9/04* (2013.01); *F16C 33/4605* (2013.01); *F16C 33/4658* (2013.01); *F16C 33/4664* (2013.01); *F16C 33/502* (2013.01); *F16C 33/56* (2013.01); *F16C 41/045* (2013.01); *F16C 2226/70* (2013.01);
(Continued)

(58) Field of Classification Search
CPC ....... F16C 9/02; F16C 19/466; F16C 33/4652; F16C 33/4676; F16C 33/4694; F16C 33/516; F16C 2226/76; Y10T 29/49691
USPC ................ 384/456–457, 501–502, 536, 539, 560,384/570, 576–577, 571–572, 579, 580, 585; 29/898.067
See application file for complete search history.

(56) References Cited

U.S. PATENT DOCUMENTS 2,884,288 A * 4/1959 Herrmann et al. ........... 384/580
3,399,008 A * 8/1968 Farrell et al. ................. 384/577
(Continued)

FOREIGN PATENT DOCUMENTS

CN 102037252 4/2011
DE 3000559 A1 * 7/1981
(Continued)

*Primary Examiner* — Marcus Charles
(74) *Attorney, Agent, or Firm* — Clark & Brody

(57) ABSTRACT

A roller bearing (21) includes a plurality of needle rollers (23), a cage (24) that retains the rollers (23), and an outer ring (22) that has a rolling surface on which the rollers roll and is split in the circumferential direction. The cage (24) includes split sections (32a), (32b) at which the cage can be split in the circumferential direction. The cage (24) is of a roller riding type or an inner land riding type.

9 Claims, 14 Drawing Sheets

(51) Int. Cl.

| | | |
|---|---|---|
| *F16C 33/60* | (2006.01) | |
| *F16C 19/46* | (2006.01) | |
| *F16C 19/26* | (2006.01) | |
| *F16C 43/04* | (2006.01) | |
| *F16C 33/58* | (2006.01) | |
| *F16C 33/50* | (2006.01) | |
| *F16C 9/02* | (2006.01) | |
| *F16C 41/04* | (2006.01) | |
| *F16C 9/04* | (2006.01) | |

(52) U.S. Cl.
CPC ........ *F16C 2226/76* (2013.01); *F16C 2226/78* (2013.01)

(56) References Cited

U.S. PATENT DOCUMENTS

| | | | | |
|---|---|---|---|---|
| 3,890,854 A | * | 6/1975 | Pitner | 74/492 |
| 4,239,304 A | * | 12/1980 | Wakunami | 384/573 |
| 4,472,006 A | * | 9/1984 | Goransson | F16C 23/086 384/576 |
| 4,623,270 A | * | 11/1986 | Olschewski | B29C 45/2628 29/898.067 |
| 4,708,498 A | * | 11/1987 | Labedan et al. | 384/560 |
| 5,184,899 A | * | 2/1993 | Harimoto | 384/560 |
| 5,735,614 A | * | 4/1998 | Isogawa | F02B 61/045 384/476 |
| 5,772,338 A | * | 6/1998 | Hillmann | F16C 33/4605 384/470 |
| 5,803,620 A | * | 9/1998 | Yokota | F16C 19/46 384/580 |
| 5,816,713 A | * | 10/1998 | Prock | F16C 19/463 384/470 |
| 6,068,409 A | * | 5/2000 | Sakai | F16C 33/4635 384/470 |
| 6,883,968 B2 | * | 4/2005 | Fugel et al. | 384/577 |
| 7,220,060 B2 | * | 5/2007 | Kono | F16C 33/46 384/572 |
| 7,258,492 B2 | * | 8/2007 | Yoon | 384/573 |
| 7,670,058 B2 | * | 3/2010 | Schorr | F16C 33/4629 384/572 |
| 7,828,485 B2 | * | 11/2010 | Waseda et al. | 384/570 |
| 8,057,105 B2 | * | 11/2011 | Earthrowl et al. | 384/577 |
| 8,220,423 B2 | * | 7/2012 | Abe et al. | 123/90.1 |
| 2003/0077017 A1 | * | 4/2003 | Fugel | F16C 33/546 384/578 |
| 2005/0084192 A1 | * | 4/2005 | Takeo et al. | 384/457 |
| 2006/0159380 A1 | * | 7/2006 | Oishi | F16C 19/30 384/623 |

FOREIGN PATENT DOCUMENTS

| | | | | |
|---|---|---|---|---|
| EP | 1219843 A2 | * | 7/2002 | ............. F16C 33/46 |
| EP | 1696143 A2 | * | 8/2006 | |
| GB | 2115889 A | * | 9/1983 | ............. B29C 45/26 |
| JP | 58-065318 | | 4/1983 | |
| JP | 2584225 | | 10/1998 | |
| JP | 2002-195270 | | 7/2002 | |
| JP | 2007-002914 | | 1/2007 | |
| JP | 2009-019701 | | 1/2009 | |
| JP | 2009-019708 | | 1/2009 | |
| JP | 2009-036329 | | 2/2009 | |
| JP | 2009250412 A | * | 10/2009 | |
| JP | 2012-007664 | | 1/2012 | |
| JP | 2012117582 A | * | 6/2012 | |

* cited by examiner

ROLLER BEARING AND SHAFT SUPPORT STRUCTURE

This application is a national phase of PCT/JP2013/061867 filed on Apr. 23, 2013, which is published as WO2013/175922 on Nov. 28, 2013, which claims priority of JP 2012-115520 filed on May 21, 2012.

TECHNICAL FIELD

This invention relates to a roller bearing and a shaft support structure.

BACKGROUND ART

These days, needle roller bearings, or needle bearings, are used on an engine's crankshaft-supporting parts or on large ends of connecting rods (conn rods), because the needle roller bearings have high load capacities even though their projected areas are small. A needle roller bearing includes a plurality of needle rollers, a cage for retaining the needle rollers, and an outer ring having a rolling surface on which the needle rollers roll. Another type of needle roller bearings may include a roller-and-cage assembly, which is a cage with needle rollers retained in advance, and an outer ring. These types of needle roller bearings exhibit low load resistance performance, but can be easily developed to rotate with low friction and low torque in comparison with sliding bearings without rolling elements. In addition, as it is relatively easy to develop the needle roller bearings that work with reduced amounts of lubricant oil, the needle roller bearings are often used as automotive parts, for example, a part of car engines.

Crankshafts, which are to be supported by the needle roller bearings, are provided with counterweights or the like at some midpoints in the axial direction, and therefore it is very difficult to mount bearing components on the crankshafts from the axial direction. To that end, an outer ring and cage are respectively split along the circumferential direction to prepare outer ring segments and cage segments that are then mounted on a shaft from the radial direction, more specifically, from the outer side of the shaft to attach a needle roller bearing.

Technologies of roller bearings used as automotive parts are disclosed in Japanese Unexamined Patent Application Publication No. 2002-195270 (PTL1), Japanese Registered Utility Model Publication No. 2584225 (PTL2), and Japanese Unexamined Patent Application Publication Nos. 2007-2914 (PTL3), 2009.19701 (PTL4), and 2009-19708 (PTL5).

CITATION LIST

Patent Literature

PTL1: Japanese Unexamined Patent Publication No. 2002-195270
PTL2: Japanese Registered Utility Model Publication No. 2584225
PTL3: Japanese Unexamined Patent Publication No. 2007-2914
PTL4: Japanese Unexamined Patent Publication No. 2009-19701
PTL5: Japanese Unexamined Patent Publication No. 2009-19708

SUMMARY OF INVENTION

Technical Problem

According to PTL1 and PTL2, the cages that retain needle rollers are of an outer land riding type. Cages of this type are guided in contact with the radially inner surface of the outer ring, thereby stabilizing the radial position of the cage.

However, adoption of such a type causes the following disadvantage. The cage makes orbital motion during operation of the bearing and constantly bears centrifugal force irrespective of loaded regions and non-loaded regions of the bearing. Since the outer land riding type cage is configured to abut against the radially inner surface of the outer ring, the centrifugal force strongly presses the radially outer surface of the cage against the radially inner surface of the outer ring. When the cage passes by the split areas of the outer ring segments that compose the outer ring, the cage may bump the split areas and possibly cause vibration or noise with the outer ring. Especially when there are large steps in the radially inner surface at the split parts of the outer ring, these tendencies become more prominent.

According to PTL3, PTL4, and PTL5, the split parts of the split outer ring are chamfered or shaped round to reduce vibration and noise caused by the contact with rollers. However, if the cage abuts against the steps, the aforementioned vibration and noise may still occur. In addition, the contact between the cage and the steps wears the cage and produces abrasion powder that in turn enters in between the cage and the outer ring to induce flaking. Under these circumstances, recent increasing demands for high-speed rotation hinder the prolongation of the bearing life. Furthermore, if the assembled outer ring segments have low roundness, the cage is caught by the steps, which may possibly inhibit smooth rotation of the cage.

This invention has an object to provide a roller bearing producing less vibration and noise and having an increased life span.

Another object of this invention is to provide a shaft support structure producing less vibration and noise and having an increased life span.

Solution to Problem

A roller bearing according to the present invention includes a plurality of rollers, a cage that retains the rollers, and an outer ring that has a rolling surface on which the rollers roll and is split in the circumferential direction. The cage includes a split section at which the cage can be split in the circumferential direction. The cage in this invention is of a roller riding type or an inner land riding type.

According to the roller bearing configured as above, the cage includes the split section at which the cage can be split in the circumferential direction, and therefore the cage can be easily mounted on a shaft from the outer side of the shaft to support it. In addition, since the cage functions as a roller riding type cage or inner land riding type cage, the cage does not abut against the outer ring in operation of the bearing. Therefore, the cage is not strongly pressed against the radially inner surface of the outer ring by centrifugal force, and vibration and noise caused when the cage contacts with split parts of the split outer ring and the wear of the cage can be eliminated. Furthermore, abrasion powder that causes flaking is not produced, and the cage can smoothly rotate irrespective of the roundness and the degree of steps in the split parts of the outer ring. As a result, vibration and noise can be reduced and the life of the bearing can be increased.

The cage may be split at the split sections into a plurality of cage members.

In addition, the cage may have engagement portions at the split section that can be engaged with each other.

Each of the cage members has an end that is provided with a projection extending in the circumferential direction and functions as one of the engagement portions, and another end that is provided with a recess extending in the circumferential direction to receive the projection and functions as the other engagement portion.

The projection has stick-out portions extending in the axial direction, and the recess has recesses extending in the axial direction to receive the projection and the stick-out portions.

The ends at the split section have outer surfaces that are sloped radially inward.

The cage may be made of resin.

The outer ring may be press-formed.

According to another aspect of the present invention, a shaft support structure includes the aforementioned roller bearing and at least one shaft selected from a crankshaft, a camshaft, and a balance shaft. The shaft is rotatably supported by the roller bearing.

Such a shaft support structure can reduce vibration and noise and increase the life span.

Advantageous Effects of Invention

According to the roller bearing configured as above, the cage includes the split section at which the cage can be split in the circumferential direction, and therefore the cage can be easily mounted on a shaft from the outer side of the shaft to support it. In addition, since the cage functions as a roller riding type cage or inner land riding type cage, the cage does not abut against the outer ring in operation of the bearing. Therefore, the cage is not strongly pressed against the radially inner surface of the outer ring by centrifugal force, and vibration and noise caused when the cage contacts with split parts of the split outer ring and the wear of the cage can be eliminated. Furthermore, abrasion powder that causes flaking is not produced, and the cage can smoothly rotate irrespective of the roundness and the degree of steps in the split parts of the outer ring. As a result, vibration and noise can be reduced and the life of the bearing can be increased.

Such a shaft support structure can reduce vibration and noise and increase the life span.

DESCRIPTION OF EMBODIMENTS

Figure 1:
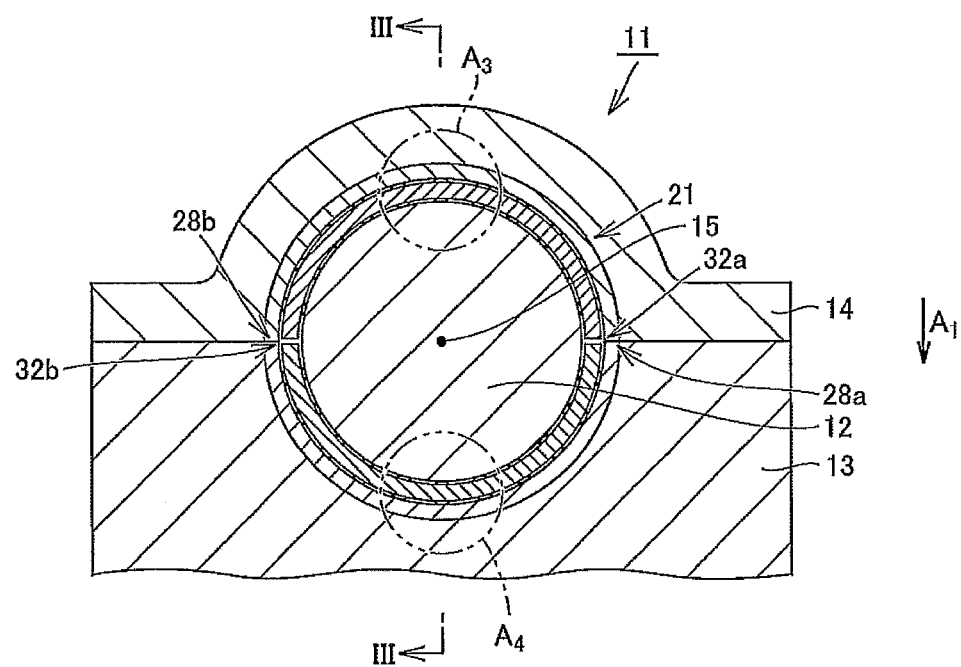
FIG. 1 is a cross-sectional view partially showing a crankshaft support structure that includes a roller bearing according to an embodiment of the invention and supports a crankshaft as a shaft.
Figure 2:
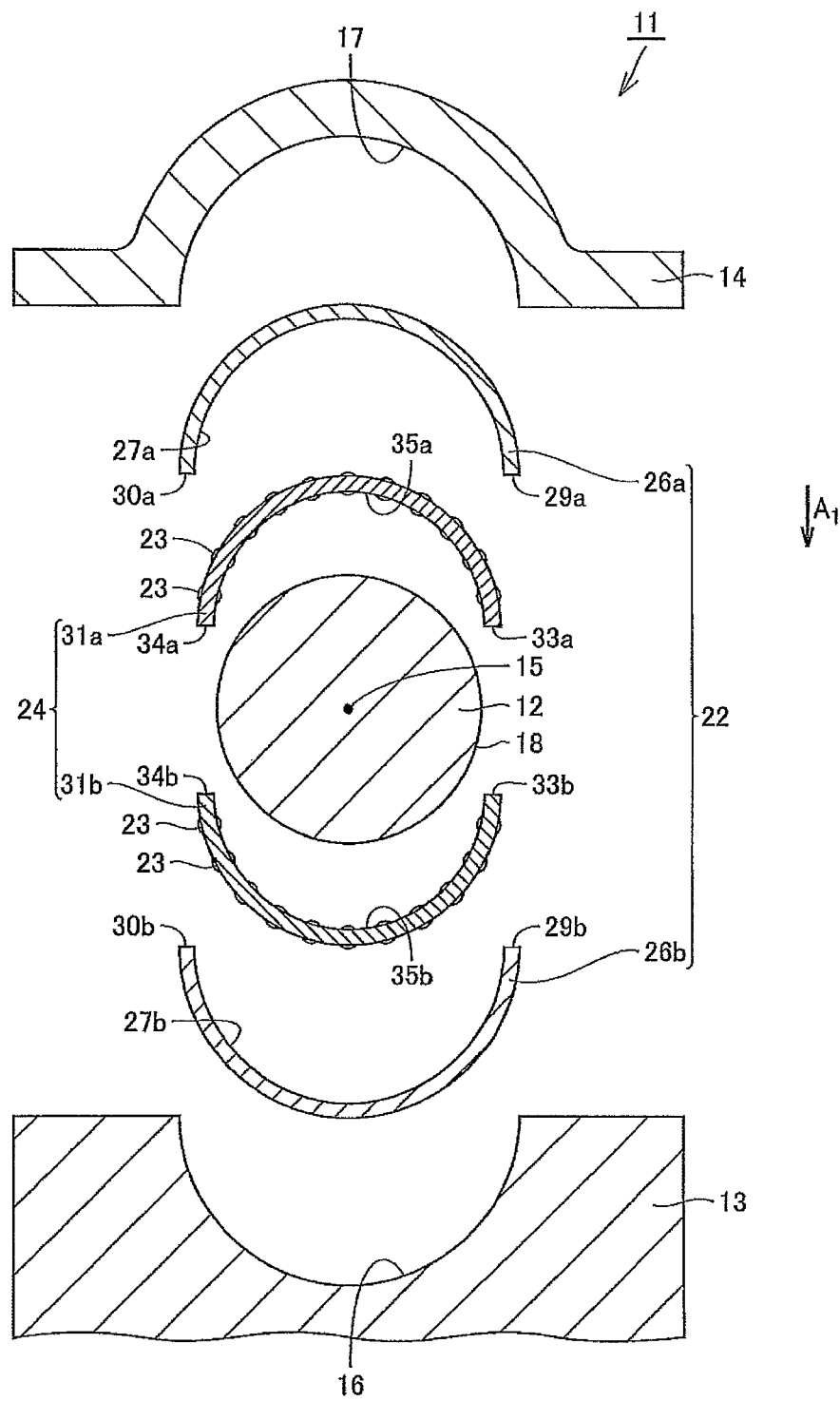
FIG. 2 is a cross-sectional view partially showing the crankshaft support structure in FIG. 1, the crankshaft support structure being partially disassembled.

With reference to the drawings, embodiments of the present invention will be described below. FIGS. 1 and 2 are cross-sectional views partially showing a crankshaft support structure that includes a roller bearing according to an embodiment of the invention and supports a crankshaft as a shaft. The cross section of the crankshaft support structure in FIGS. 1 and 2 is taken along a plane normal to the crankshaft. In order to provide a clear understanding, the crankshaft support structure in FIG. 2 is partially disassembled from the assembly of FIG. 1. Note that the upward/downward direction in the sheets of paper on which the drawings of FIGS. 1 and 2 are laid out is defined as an upward/downward direction, and the direction indicated by an arrow $A_1$ in FIG. 1 is defined as a downward direction. In addition, some components, such as needle rollers to be described later, are not hatched to provide clear understanding.

Referring to FIGS. 1 and 2, a crankshaft support structure 11 includes a crankshaft 12 that extends from the front side to the back side of the drawing sheet of FIG. 1, a needle roller bearing 21 that rotatably supports the crankshaft 12, and an engine block 13 and a cap 14 on which the needle roller bearing 21 is mounted. The crankshaft 12 rotates about a rotation axis 15 extending from the front side to the back side of the drawing sheet of FIG. 1. The engine block 13 is disposed on the lower side of the needle roller bearing 21, while the cap 14 is disposed on the upper side thereof. The engine block 13 and cap 14 have concave portions 16, 17, respectively, that are shaped into cross-sectionally semicircular arcs recessed so that the needle roller bearing 21 fits. The needle roller bearing 21 with the cap 14 placed on the upper side thereof is mounted on the upper side of the engine block 13, and then the engine block 13 and cap 14 with the needle roller bearing 21 sandwiched therebetween are fastened with bolts (not shown) in the upward/downward direction, whereby the needle roller bearing 21 is attached to the crankshaft support structure 11. The outer ring of the needle roller bearing 21 is fixed so as not to rotate, but the cage and the needle rollers retained in the cage rotate.

Figure 3:
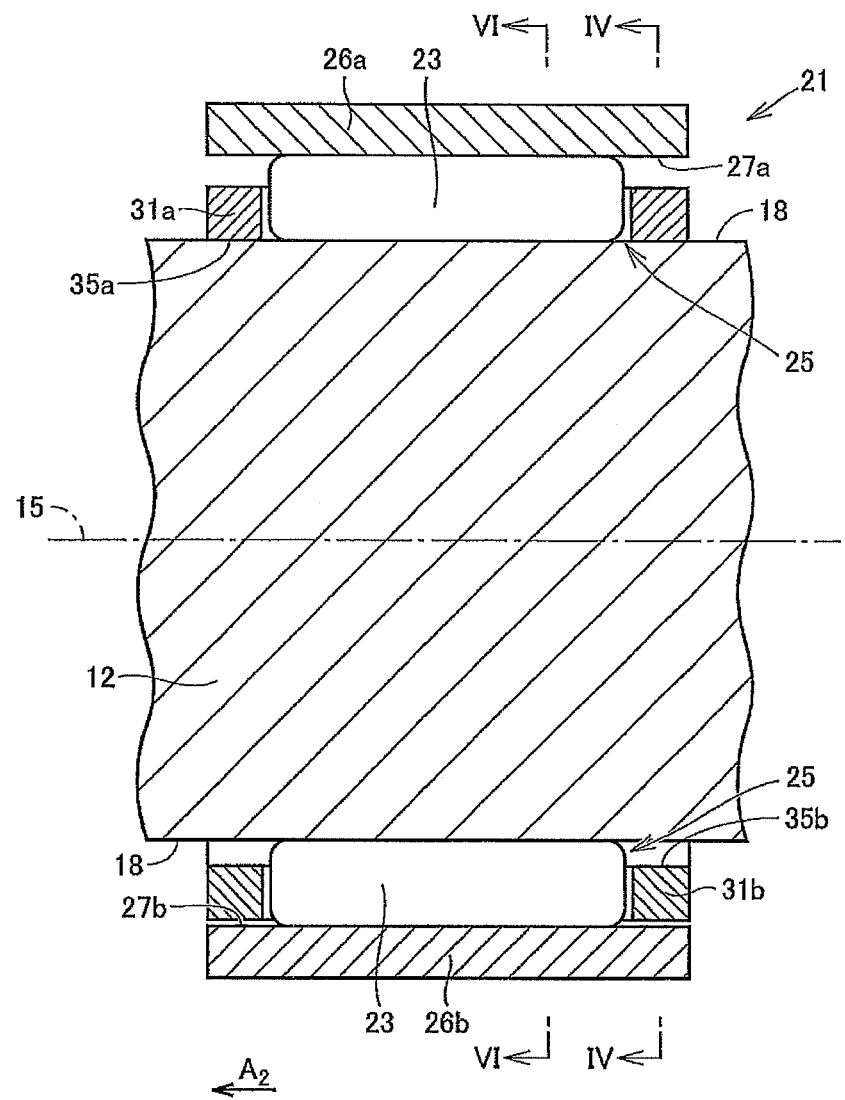
FIG. 3 is a cross-sectional view of the needle roller bearing according to the embodiment of the invention, the needle roller bearing being mounted in the crankshaft support structure shown in FIGS. 1 and 2.

Next, the configuration of the needle roller bearing 21 in the crankshaft support structure 11 will be described. FIG. 3 is a cross-sectional view of the needle roller bearing according to the embodiment of the invention, the needle roller bearing being mounted in the crankshaft support structure 11 as shown in FIGS. 1 and 2. The cross-sectional view of FIG. 3 shows a cross section of the needle roller bearing that is cut along a plane containing the rotation axis 15 of the crankshaft supported by the needle roller bearing 21 and being in parallel with the rotation axis 15.

Referring to FIGS. 1 to 3, the needle roller bearing 21 includes an annular outer ring 22, a plurality of needle rollers 23 serving as rolling elements, and a cage 24 that retains the needle rollers 23. The needle rollers 23 roll on a raceway of the outer ring 22, more specifically, on radially inner surfaces 27a, 27b of respective split outer-ring members 26a, 26b that compose the outer ring 22. In short, the outer ring 22 includes a rolling surface on which the needle rollers 23 roll. The needle rollers 23 also roll on a radially outer surface 18, serving as a raceway, of the crankshaft 12. The cage 24 has pockets 25 each formed to house a needle roller 23, and the needle rollers 23 are housed and retained in the pockets 25.

As described above, the outer ring 22 includes two split outer-ring members 26a, 26b. The split outer-ring members 26a, 26b are shaped by cutting an annular outer ring 22 at two points located along the circumferential direction, more specifically, by cutting the outer ring 22 along a plane containing the rotation axis 15 of the needle roller bearing 21 and being in parallel with the rotation axis 15. The rotation axis 15 is also a rotation axis of the crankshaft 12. In short, the outer ring 22 is made by cutting a single annular outer ring material at two split sections 28a, 28b opposed to each other by 180 degrees into the two split outer-ring members 26a, 26b. In other words, the outer ring 22 can be split into two split outer-ring members 26a, 26b, and conversely, the split outer-ring members 26a, 26b arranged in the circumferential direction form the single annular outer ring 22. The split outer-ring members 26a, 26b are assembled as follows: a circumferential end 29a of the split outer-ring member 26a and a circumferential end 29b, facing the end 29a, of the split outer-ring member 26b are aligned with each other and attached, while a circumferential end 30a of the split outer-ring member 26a and a circumferential end 30b of the split outer-ring member 26b, facing the end 30a, are aligned with each other and attached. The ends 29a, 29b, 30a, 30b have roughly flat surfaces.

The outer ring 22 is a press-formed ring. That is, the outer ring 22 is formed by stamping. Each of the split outer-ring members 26a, 26b is a press-formed part. Accordingly, the outer ring 22 can be manufactured at lower costs. In addition, the outer-ring members formed from a press-formable plate material result in a thin outer ring. Making the outer ring thin can save space and thereby increase design flexibility of the peripheral structure.

The cage 24 retaining the needle rollers 23 is also composed of two split cage members 31a, 31b. The split cage members 31a, 31b are shaped by cutting the annular cage 24 at two points in the circumferential direction, more specifically, cutting along a plane containing the rotation axis 15 of the needle roller bearing 21 and being in parallel with the rotation axis 15. More concretely, cutting an annular member along roughly 180-degree opposed points provides equivalents to the split cage members 31a, 31b. In short, the cage 24 is made up with two split cage members 31a, 31b that are made by cutting a single annular cage member at two split sections 32a, 32b opposed to each other by 180 degrees. In other words, the cage 24 can be split into two split cage members 31a, 31b, and conversely, the split cage members 31a, 31b arranged in the circumferential direction form the single annular cage 24. The split cage members 31a, 31b arranged in the circumferential direction have a clearance therebetween. This means that the split cage members 31a, 31b are semi-arc shaped members of slightly less than 180 degrees. A circumferential end 33a of the split cage member 31a and an end 33b, facing the end 33a, of the split cage member 31b are aligned with each other and a circumferential end 34a of the split cage member 31a and an end 34b, facing the end 34a, of the split cage member 31b are aligned with each other. A clearance is provided between the end 33a and end 34a and between the end 33b and end 34b. The split cage members 31a, 31b are not coupled and are movable freely in operation of the bearing. Each of the split cage members 31a, 31b makes orbital motion around the rotation axis 15 in operation of the bearing.

This configuration, specifically, the configuration in which the outer ring 22 and cage 24 retaining the needle rollers 23 are separable in the circumferential direction allows the respective constituent components of the needle roller bearing 21 to be mounted on the crankshaft 12 from the radially outer side. Therefore, this configuration allows the needle roller bearing 21 to be mounted without interference with counterweights (not shown) and like components located on the crankshaft 12 along the axial direction.

The cage 24 is made of resin. Thus, the split cage members 31a, 31b are made of resin. Making the split cage members 31a, 31b with resin can reduce the weight of the cage 24. Such a resin cage can be formed by injection molding, thereby improving productivity, including mass productivity, and resulting in low costs. In addition, the design flexibility of pockets and roller stoppers formed in the pockets can be ensured.

Figure 4:
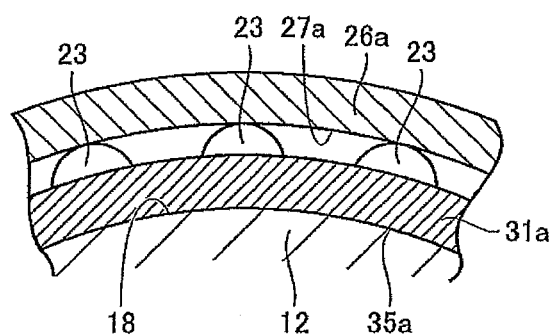
FIG. 4 is an enlarged cross-sectional view showing a part of the needle roller bearing in FIG. 3 in operation, taken along IV-IV in FIG. 3.
Figure 5:
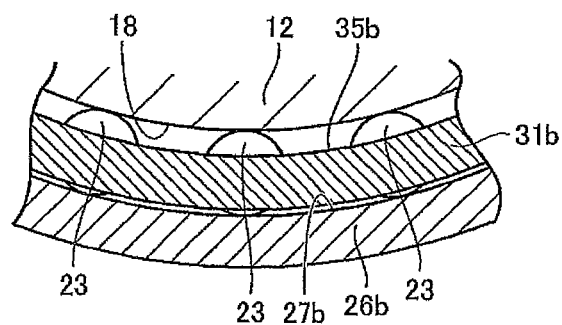
FIG. 5 is an enlarged cross-sectional view showing a part of the needle roller bearing in FIG. 3 in operation.
Figure 6:
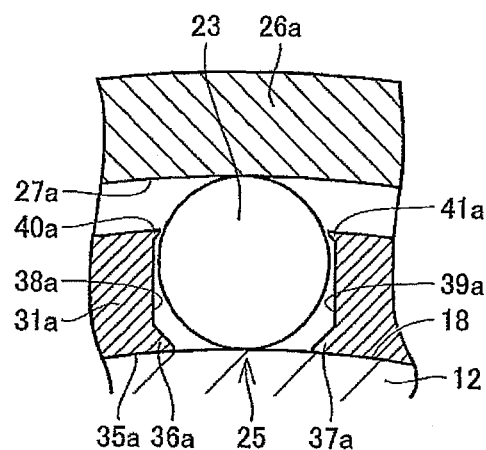
FIG. 6 is an enlarged cross-sectional view showing a part of the needle roller bearing in FIG. 3 in operation, taken along VI-VI in FIG. 3.
Figure 7:
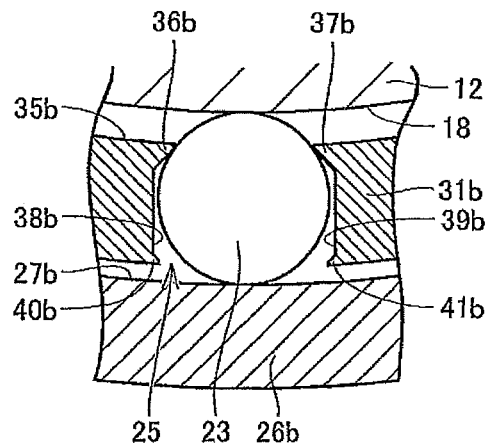
FIG. 7 is an enlarged cross-sectional view showing a part of the needle roller bearing in FIG. 3 in operation.

A detailed description will be made about the configuration of the cage 24. FIGS. 4, 5, 6, and 7 are enlarged cross-sectional views showing a part of the needle roller bearing 21 in FIG. 3 in operation of the same. FIGS. 4 and 6 are cross-sectional views showing an area of upper side of the needle roller bearing 21, taken along IV-IV and VI-VI in FIG. 3, respectively, as viewed in one direction indicated by an arrow $A_2$ along the rotation axis 15 in FIG. 3. The upper area corresponds to an area $A_3$ indicated by a dashed double-dotted line in FIG. 1. FIGS. 5 and 7 are cross-sectional views showing an area of lower side of the needle roller bearing 21 in FIG. 3 as viewed in one direction indicated by the arrow $A_2$ along the rotation axis 15 in FIG. 3. The lower area corresponds to an area $A_4$ indicated by a dashed triple-dotted line in FIG. 1. FIGS. 4 and 5 show the split cage member cut so as to include a part continuously extending in the circumferential direction, while FIGS. 6 and 7 show the split cage member cut so as to avoid the part continuously extending in the circumferential direction.

Referring to FIGS. 1 to 7, the split cage members 31a, 31b include radially inner roller stoppers and radially outer roller stoppers to prevent the needle rollers 23 housed in the pockets 25 from falling off. Description is now made with the split cage member 31a located on the upper side. Referring now more particularly to FIG. 6, the radially inner roller stoppers 36a, 37a, which are located to face each other, are formed so as to project from a radially inner side of wall surfaces 38a, 39a of a pocket 25 toward the pocket 25 in the circumferential direction. The radially outer roller stoppers 40a, 41a, which are located to face each other, are formed so as to project from a radially outer side of the wall surfaces 38a, 39a of the pocket 25 toward the pocket 25 in the circumferential direction. The radially inner roller stoppers 36a, 37a are formed so as to project toward the pocket 25 by an amount more than the amount by which the radially outer roller stoppers 40a, 41a project toward the pocket 25. The radially inner roller stoppers 36a, 37a and radially outer roller stoppers 40a, 41a allow the needle rollers 23 to move slightly in the radial direction in the pockets 25. In other words, the split cage member 31a can move in the radial direction relative to the needle rollers 23. The radial direction in this embodiment is the upward/downward direction in the cross section in FIG. 6. The radially inner roller stoppers 36a, 37a may be positioned the same as, but can be different from the radially outer roller stoppers 40a, 41a in the axial direction.

Similarly, the split cage member 31b located on the lower side is also provided with radially inner roller stoppers 36b, 37b and radially outer roller stoppers 40b, 41b that project from a radially inner side and outer side, respectively, of the wall surfaces 38b, 39b of a pocket 25 in the circumferential direction toward the pocket 25.

The cage 24 in this embodiment is configured to be an inner land riding type or a roller riding type. Since the cage 24 is composed of two split cage members 31a, 31b that are not fixed and can move freely, the cage 24 functions as an inner land riding type or a roller riding type depending on its position in the bearing. In this embodiment, the cage 24 is configured as a roller riding type by adjusting the projection amount of the radially inner roller stoppers 36a, 37a toward the pocket 25 or applying other techniques.

This configuration will be described. Each of the split cage members 31a, 31b makes orbital motion around the rotation axis 15 as described above. When the split cage member 31a is positioned on the upper side, a force acts on the split cage member 31a to move toward the inner side, or downward in the drawing sheets of FIGS. 4 and 6, due to the self-weight of the split cage member 31a. This force causes the radially inner surface 35a of the split cage member 31a to abut on the radially outer surface 18 of the crankshaft 12. At this moment, the split cage member 31a functions as an inner land riding type, and the radially inner surface 35a of the split cage member 31a functions as a guide portion.

On the other hand, when the split cage member 31b is positioned on the lower side, a force acts on the split cage member 31b to move toward the outer side, or downward on the drawing sheets of FIGS. 5 and 7, due to the self-weight of the split cage member 31b and centrifugal force. In this case, the radially inner roller stoppers 36b, 37b restrict the movement of the split cage member 31b toward the outer side, or the downward movement, thereby bringing the radially inner roller stopper 36b, 37b into abutment against the needle rollers 23. At this moment, the split cage member 31b functions as a roller riding type, and the radially inner roller stoppers 36b, 37b of the split cage member 31b function as a guide portion. This means that there is a clearance between the radially inner surface 35b of the split cage member 31b and the radially outer surface 18 of the crankshaft 12. As described above, the split cage members 31a, 31b of the cage 24 function as an inner land riding type when they are on the upper side in the orbital motion, while functioning as a roller riding type when they are on the lower side. By the way, when the split cage members 31a, 31b are positioned on the lateral sides, the split cage members 31a, 31b function as a roller riding type or an inner land riding type depending on the balance between the centrifugal force and self-weight. Even though the split cage members 31a, 31b are positioned anywhere in the circumferential direction, the split cage members 31a, 31b do not abut against the radially inner surfaces 27a, 27b of the respective split outer-ring members 26a, 26b making up the outer ring 22.

According to the needle roller bearing 21 configured as above, since the cage 24 includes the split sections 32a, 32b at which the cage 24 can be split in the circumferential direction, the needle roller bearing 21 can be mounted on the crankshaft 12 from the outer side to support the crankshaft 12, thereby enabling easy attachment. In addition, the cage 24 capable of functioning as a roller riding type or inner land riding type does not abut against the outer ring 22 in operation of the bearing. Therefore, the cage 24 is not strongly pressed against the radially inner surfaces 27a, 27b of the outer ring 22 by centrifugal force, thereby preventing vibration and noise and wearing of the cage 24 caused by contact between the cage 24 and the split sections 28a, 28b of the split outer ring 22. Additionally, the cage 24 does not produce abrasion powder that causes flaking and therefore can smoothly rotate irrespective of the roundness of the outer ring 22 and the degree of steps at the split sections 28a, 28b. As a result, vibration and noise can be reduced and the life of the bearing can be increased.

In this embodiment, the split cage members of the cage of the needle roller bearing are configured to function as an inner land riding type when they are on the upper side and to function as a roller riding type when they are on the lower side; however, the present invention is not limited thereto and the split cage members can be configured to function as a roller riding type when they are on both the upper and lower sides.

Figure 8:
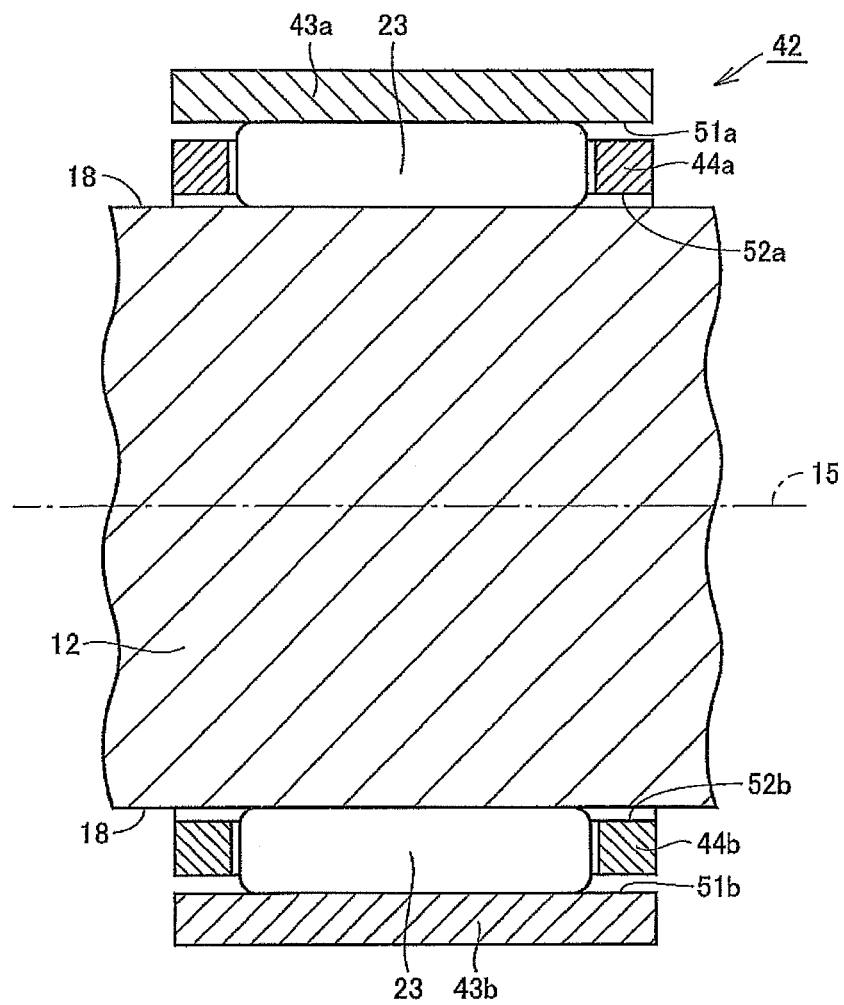
FIG. 8 is a cross-sectional view of a needle roller bearing according to another embodiment of the invention, the needle roller bearing being mounted in a crankshaft support structure.
Figure 9:
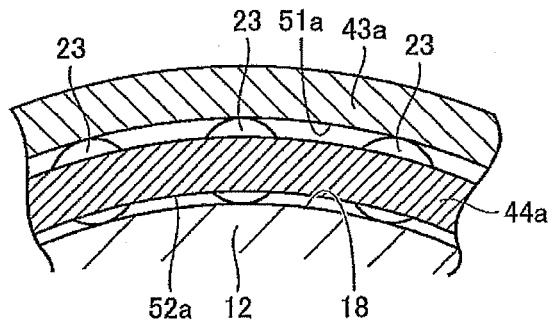
FIG. 9 is an enlarged cross-sectional view showing a part of the needle roller bearing in FIG. 8 in operation.
Figure 10:
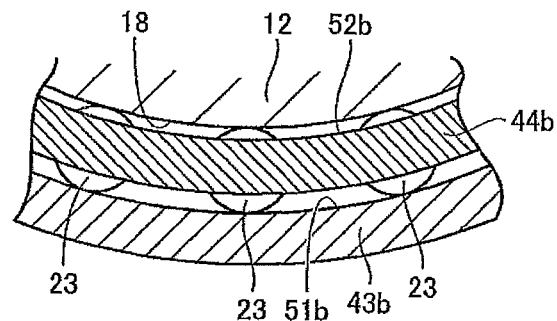
FIG. 10 is an enlarged cross-sectional view showing a part of the needle roller bearing in FIG. 8 in operation.
Figure 11:
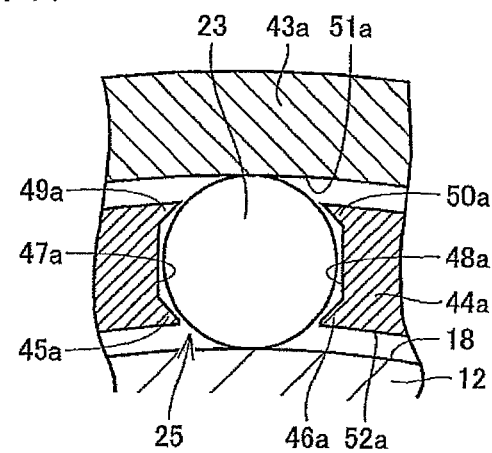
FIG. 11 is an enlarged cross-sectional view showing a part of the needle roller bearing in FIG. 8 in operation.
Figure 12:
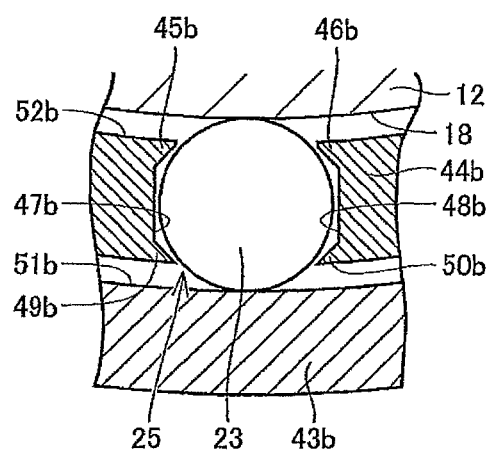
FIG. 12 is an enlarged cross-sectional view showing a part of the needle roller bearing in FIG. 8 in operation.

FIG. 8 is a cross-sectional view of a needle roller bearing 42 whose split cage members are configured as above. FIG. 8 corresponds to the cross section in FIG. 3. FIGS. 9, 10, 11, and 12 are enlarged cross-sectional views showing a part of the needle roller bearing 42 in FIG. 8 in operation. FIGS. 9 and 11 are cross-sectional views showing an area of upper side of the needle roller bearing 42 in FIG. 8 as viewed in one direction indicated by the arrow $A_2$ along the rotation axis 15 in FIG. 8. The upper area corresponds to an area $A_3$ indicated by a dashed double-dotted line in FIG. 1. FIGS. 10 and 12 are cross-sectional views showing an area of lower side of the needle roller bearing 42 in FIG. 8 as viewed in one direction indicated by the arrow $A_2$ along the rotation axis 15 in FIG. 8. The lower area corresponds to an area $A_4$ indicated by a dashed triple-dotted line in FIG. 1. FIGS. 9 and 10 show the split cage member cut so as to include a part continuously extending in the circumferential direction, while FIGS. 11 and 12 show the split cage member cut so as to avoid the part continuously extending in the circumferential direction. The cross section in FIG. 9 corresponds to the cross section in FIG. 4, the cross section in FIG. 10 corresponds to the cross section in FIG. 5, the cross section in FIG. 11 corresponds to the cross section in FIG. 6, and the cross section in FIG. 12 corresponds to the cross section in FIG. 7. Through FIGS. 8 to 12, like components are denoted by like numerals as of FIG. 3 and the other drawings and thus the description thereof will not be reiterated.

Referring to FIGS. 8 to 12, the needle roller bearing 42 includes an annular outer ring, a plurality of needle rollers 23 serving as rolling elements, a cage that retains the needle rollers 23. The outer ring is composed of two split outer-ring members 43*a*, 43*b* as with the case of the needle roller bearing 21 shown in FIG. 3 and other drawings. The cage retaining the needle rollers 23 is also composed of two split cage members 44*a*, 44*b* as with the case of the needle roller bearing 21 shown in FIG. 3 and other drawings.

Each of the split cage members 44*a*, 44*b* has radially inner roller stoppers and radially outer roller stoppers that prevent the needle rollers 23 housed in pockets 25 from falling off. Description is now made with the split cage member 44*a* located on the upper side. Referring now more particularly to FIG. 11, the radially inner roller stoppers 45*a*, 46*a*, which are located to face each other, are formed so as to project from a radially inner side of wall surfaces 47*a*, 48*a* of a pocket 25 toward the pocket 25 in the circumferential direction. The radially outer roller stoppers 49*a*, 50*a*, which are located to face each other, are formed so as to project from a radially outer side of the wall surfaces 47*a*, 48*a* of the pocket 25 toward the pocket 25 in the circumferential direction. In this case, the radially inner roller stoppers 45*a*, 46*a* are formed so as to project toward the pocket 25 by an amount roughly equal to the amount by which the radially outer roller stoppers 49*a*, 50*a* project toward the pocket 25. The radially inner roller stoppers 45*a*, 46*a* and radially outer roller stoppers 49*a*, 50*a* allow the needle rollers 23 to move slightly in the radial direction in the pockets 25. In other words, the split cage member 44*a* can move in the radial direction relative to the needle rollers 23. The radial direction in this embodiment is the upward/downward direction in the cross section in FIG. 11.

Similarly, the split cage member 44*b* located on the lower side is also provided with radially inner roller stoppers 45*b*, 46*b* and radially outer roller stoppers 49*b*, 50*b* that project from a radially inner side and outer side, respectively, of the wall surfaces 47*b*, 48*b* of a pocket 25 in the circumferential direction toward the pocket 25.

The cage in this embodiment is configured to function as an inner land riding type or roller riding type. In this case, the cage is composed of two split cage members 44*a*, 44*b* each functioning as a roller riding type.

This configuration will be described. Each of the split cage members 44*a*, 44*b* makes orbital motion around the rotation axis 15 as described above. When the split cage member 44*a* is positioned on the upper side, a force acts on the split cage member 44*a* to move toward the inner side, or downward in the drawing sheets of FIGS. 9 and 11, due to the self-weight of the split cage member 44*a*. In this case, the radially outer roller stoppers 49*a*, 50*a* restrict the movement of the split cage member 44*a* toward the inner side, or the downward movement, thereby bringing the radially outer roller stopper 49*a*, 50*a* into abutment against the needle rollers 23. At this moment, the split cage member 44*a* functions as a roller riding type, and the radially outer roller stoppers 49*a*, 50*a* of the split cage member 44*a* function as a guide portion.

On the other hand, when the split cage member 44*b* is positioned on the lower side, a force acts on the split cage member 44*b* to move toward the outer side, or downward on the drawing sheets of FIGS. 10 and 12, due to the self-weight of the split cage member 44*b* and centrifugal force. In this case, the radially inner roller stoppers 45*b*, 46*b* restrict the movement of the split cage member 44*b* toward the outer side, or the downward movement, thereby bringing the radially inner roller stoppers 45*b*, 46*b* into abutment against the needle rollers 23. At this moment, the split cage member 44*b* functions as a roller riding type, and the radially inner roller stoppers 45*b*, 46*b* of the split cage member 44*b* function as a guide portion. As described above, the split cage members 44*a*, 44*b* of the cage function as a roller riding type wherever they are placed, even on the lateral sides, in orbital motion. Therefore, the split cage members 44*a*, 44*b* do not abut on the radially inner surfaces 51*a*, 51*b* of the respective split outer-ring members 43*a*, 43*b* of the outer ring wherever the split cage members 44*a*, 44*b* are placed in the circumferential direction. In addition, the radially inner surfaces 52*a*, 52*b* of the split cage member 44*a*, 44*b* also do not abut on the radially outer surface 18 of the crankshaft 12.

Since the cage functions as a roller riding type in the needle roller bearing 42 configured as above, the cage does not abut against the outer ring in operation of the bearing. Therefore, the cage is not strongly pressed against the radially inner surface of the outer ring by centrifugal force, and vibration and noise between the cage and split parts of the split outer ring and the wear of the cage can be eliminated. Furthermore, abrasion powder that causes flaking is not produced, and the cage can smoothly rotate irrespective of roundness of the outer ring and the degree of steps in the split parts. As a result, vibration and noise can be reduced and the life of the bearing can be increased.

In the above-described embodiments, the two split cage members making up the cage are configured to have flat ends in the circumferential direction and have a clearance therebetween; however, the present invention is not limited thereto and the split cage members can be configured to have engagement portions, which can be engaged with each other, at the split sections at which the cage is split in the circumferential direction.

Figure 13:
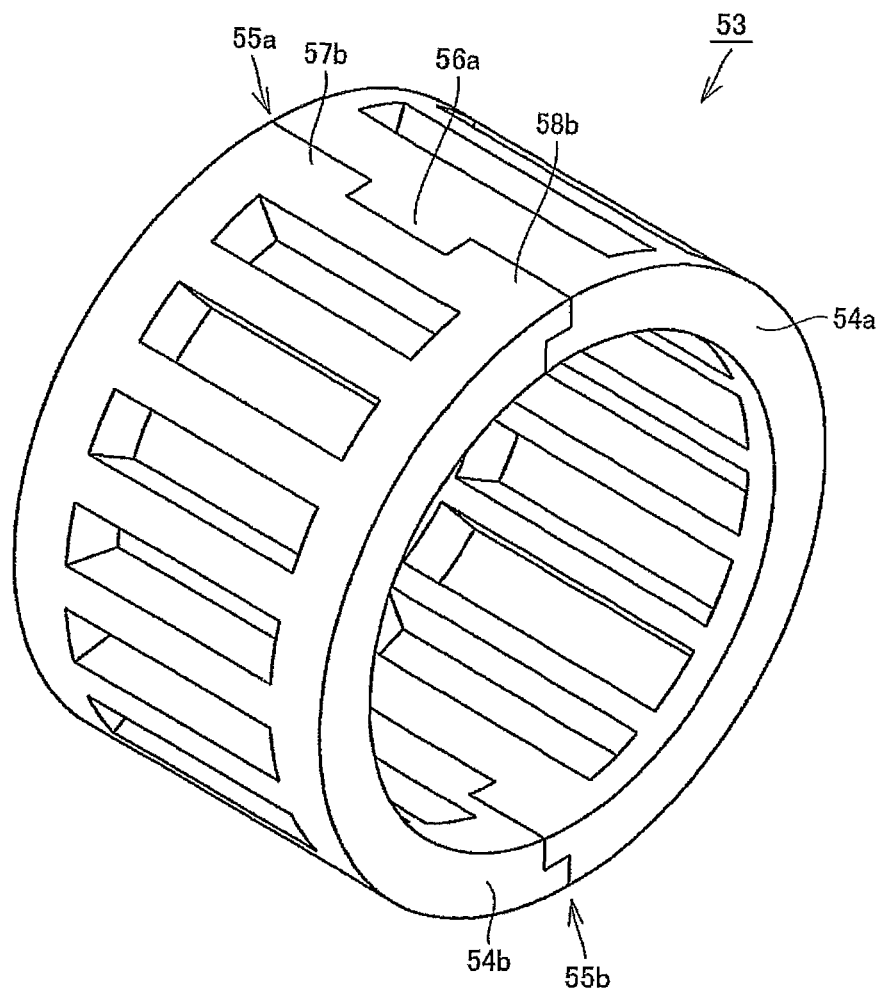
FIG. 13 is a schematic perspective view of a cage provided to a needle roller bearing according to yet another embodiment of the invention.
Figure 14:
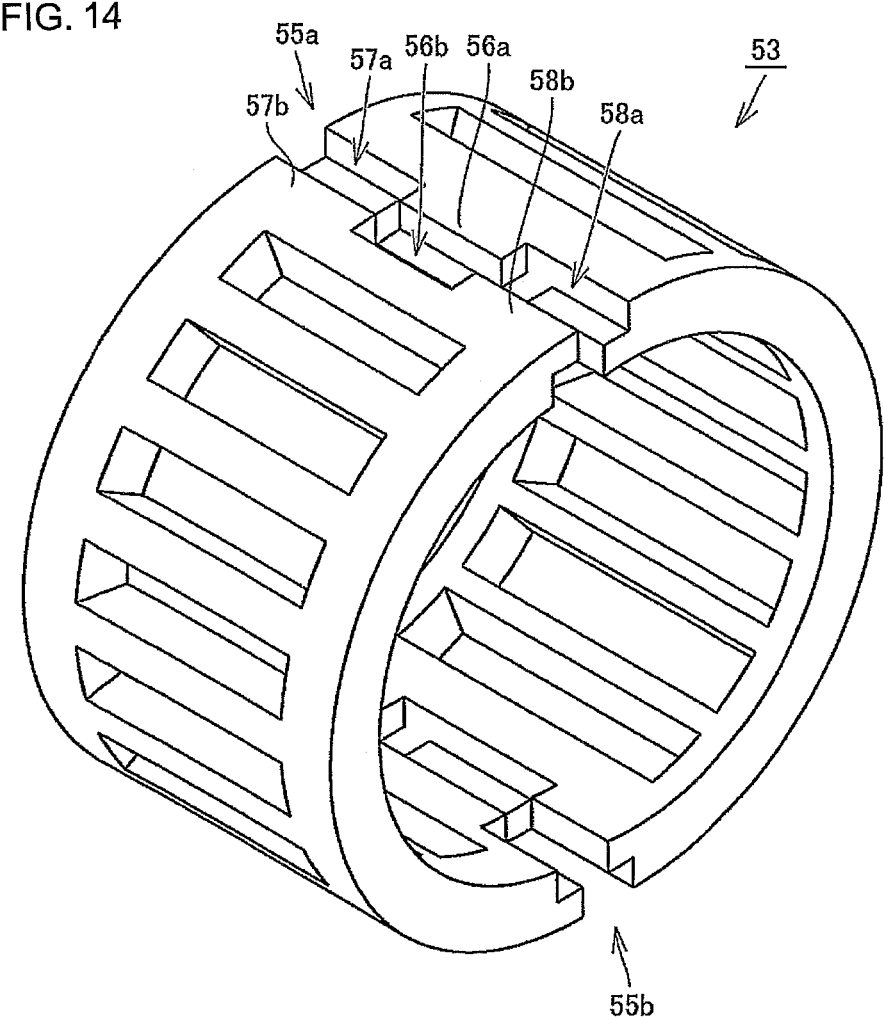
FIG. 14 is a schematic perspective view of a cage provided to a needle roller bearing according to yet another embodiment of the invention.

FIGS. 13 and 14 are schematic perspective views of a cage of a roller bearing adopting the aforementioned configuration. FIG. 13 shows the cage with engagement portions, which will be described later, engaged with each other, and FIG. 14 shows the cage with the engagement portions not engaged, that is, with the split cage members being separated from each other. In order to provide a clear understanding, roller stoppers and some other parts are not illustrated in FIGS. 13 and 14.

Referring to FIGS. 13 and 14, a needle roller bearing according to yet another embodiment of the present invention has a cage 53 composed of two split cage members 54*a*, 54*b*. The cage 53 is made by splitting an annular member into the two split cage members 54*a*, 54*b* at two split sections 55*a*, 55*b* opposed to each other by 180 degrees.

At the split sections 55a, 55b in this embodiment, there are provided engagement portions used to engage the two split cage members 54a, 54b. Specifically, the split cage member 54a has a circumferential end opposed to the split cage member 54b, and the end is provided with a projection 56a projecting in the circumferential direction. The projection 56a is formed in the center of the split cage member 54a in the axial direction. On the other hand, the split cage member 54b has a circumferential end opposed to the split cage member 54a, and the end is provided with a recess 56b recessed in the circumferential direction to receive the projection 56a projecting in the circumferential direction. The recess 56b is also formed in the center of the split cage member 54b in the axial direction. In addition, the split cage member 54b is provided with a pair of projections 57b, 58b that are positioned relative to the recess 56b and project in the circumferential direction. On the other hand, the split cage member 54a has a pair of recesses 57a, 58a that are recessed in the circumferential direction relative to the projection 56a so as to correspond to the pair of projections 57a, 57b, respectively, and are shaped so as to receive the projections 57b, 58b.

The projections 56a, 57b, 58b and the recesses 56b, 57a, 58a form engagement portions. At the split section 55b located 180 degrees opposite to the split section 55a, analogous engagement portions are also provided. In this case, the split cage members 54a, 54b are configured to be the same in shape. Specifically, each of the split cage members 54a, 54b has a projection and a pair of recesses at one circumferential end and a recess and a pair of projections at the other circumferential end. The aforementioned shapes of the projections and recesses appear as viewed from the outer side. When viewed from the inner side, the projections and recesses are configured to have inverted shapes.

According to the configuration, the engagement portions engaged with each other can restrict the axial movement and radial movement of the respective split cage members. Thus, the cage can be guided more stably.

Figure 15:
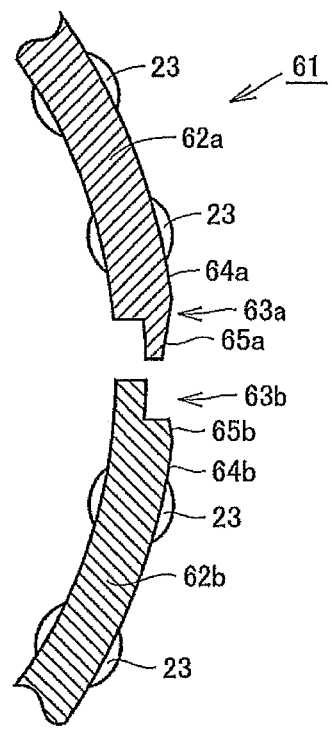
FIG. 15 is a cross-sectional view showing a part of a cage to be provided to a needle roller bearing according to yet another embodiment of the invention.
Figure 16:
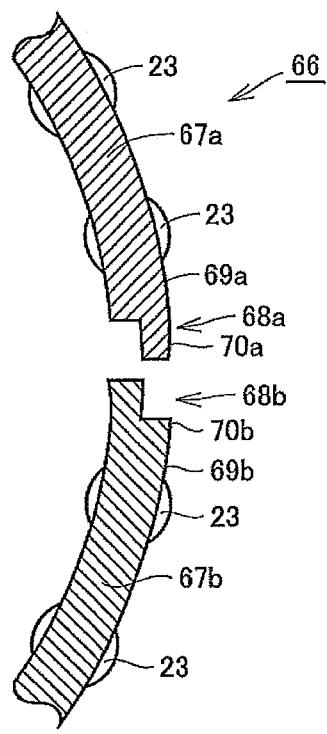
FIG. 16 is a cross-sectional view showing a part of a cage to be provided to a needle roller bearing according to yet another embodiment of the invention.

The circumferential ends of the split cage members can have an inwardly-sloped shape. FIG. 15 is a cross-sectional view partially showing a cage provided in a needle roller bearing configured as above. Referring to FIG. 15, a cage 61 includes split cage members 62a, 62b having circumferential ends 63a, 63b, respectively, and radially outer surfaces 64a, 64b of the respective ends 63a, 63b have chamfers 65a, 65b, respectively, so as to be sloped toward the inner side. The cage can be configured as above. This configuration reduces the possibility that the circumferential ends 63a, 63b of the split cage members 62a, 62b abut against the radially inner surface of the outer ring and the possibility that the ends 63a, 63b are caught by the steps at the split sections of the outer ring. Thus, the cage can be guided more stably. To provide a more stable guide, as shown in FIG. 16, the circumferential ends of the split cage members can be shaped round to smoothly curve the ends inwardly, but not chamfered. Specifically, a cage 66 may include split cage members 67a, 67b having circumferential ends 68a, 68b, respectively, and the ends 68a, 68b have round portions 70a, 70b smoothly curved inwardly on the radially outer surfaces 69a, 69b.

The cage according to the aforementioned embodiments is composed of two split cage members; however, the present invention is not limited thereto and the cage can be configured to be one piece and have a split section at which the cage can be split in the circumferential direction.

Figure 17:
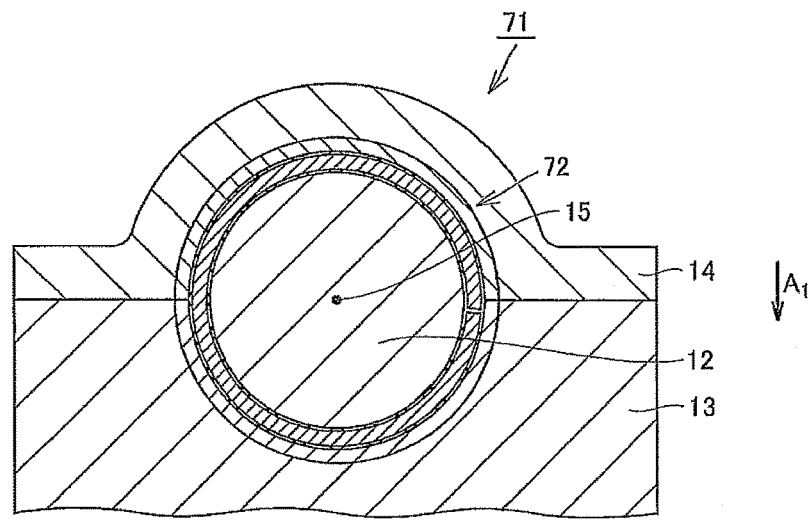
FIG. 17 is a cross-sectional view partially showing a crankshaft support structure that includes a roller bearing according to yet another embodiment of the invention and supports a crankshaft as a shaft.
Figure 18:
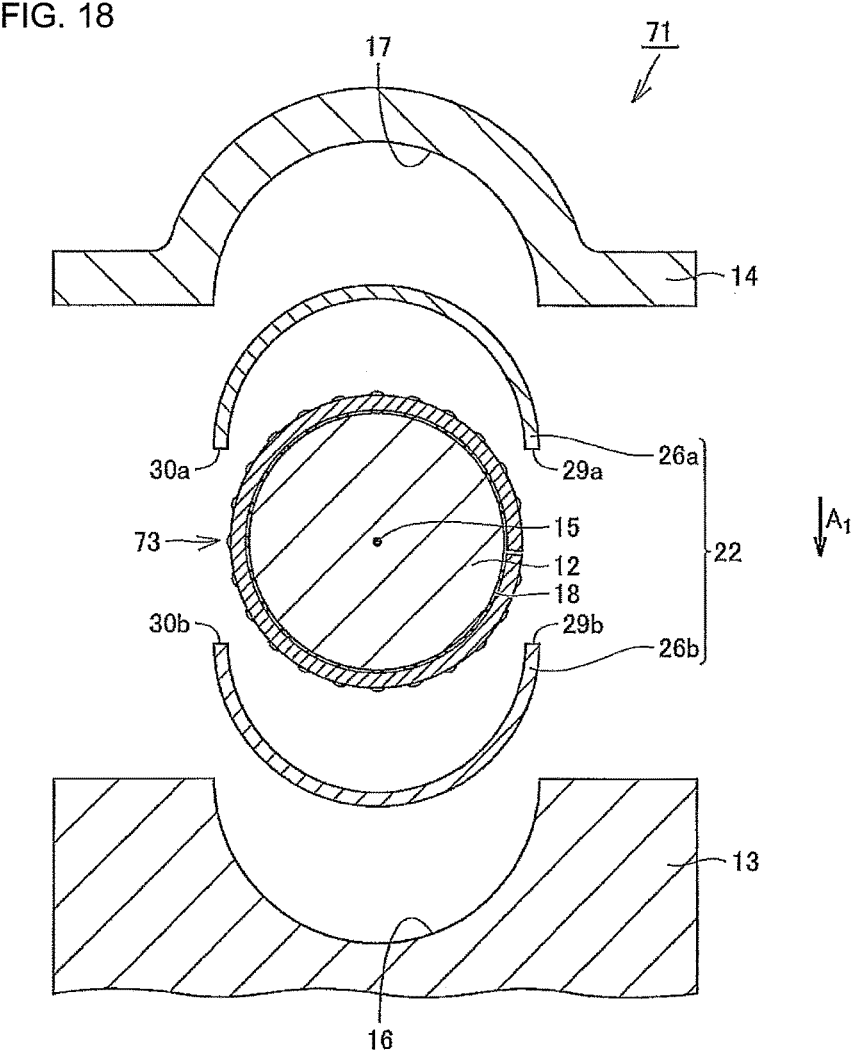
FIG. 18 is a cross-sectional view partially showing the crankshaft support structure in FIG. 17, the crankshaft support structure being partially disassembled.

FIGS. 17 and 18 are cross-sectional views showing a part of a crankshaft support structure that includes a roller bearing according to yet another embodiment of the invention and supports a crankshaft as a shaft. FIGS. 17 and 18 show a cross section of the crankshaft support structure taken along a plane normal to the crankshaft and correspond to FIGS. 1 and 2, respectively.

Referring to FIGS. 17 and 18, a crankshaft support structure 71 includes a crankshaft 12 that extends from the front side to the back side of the drawing sheet of FIG. 1, a needle roller bearing 72 that rotatably supports the crankshaft 12, and an engine block 13 and a cap 14 on which the needle roller bearing 72 is mounted. The crankshaft 12 rotates about a rotation axis 15 extending from the front side to the back side of the drawing sheet of FIG. 17. The components, such as an engine block 13, making up the crankshaft support structure, except for the cage of the needle roller bearing, are the same as those in FIG. 1, and therefore are denoted with the like numerals and the details thereof are not reiterated.

Figure 19:
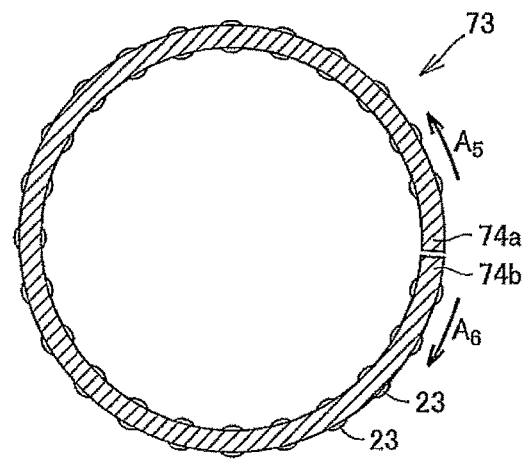
FIG. 19 is a cross-sectional view of a cage to be provided to a needle roller bearing according to yet another embodiment of the invention, the needle roller bearing being mounted in the crankshaft support structure in FIG. 17.
Figure 20:
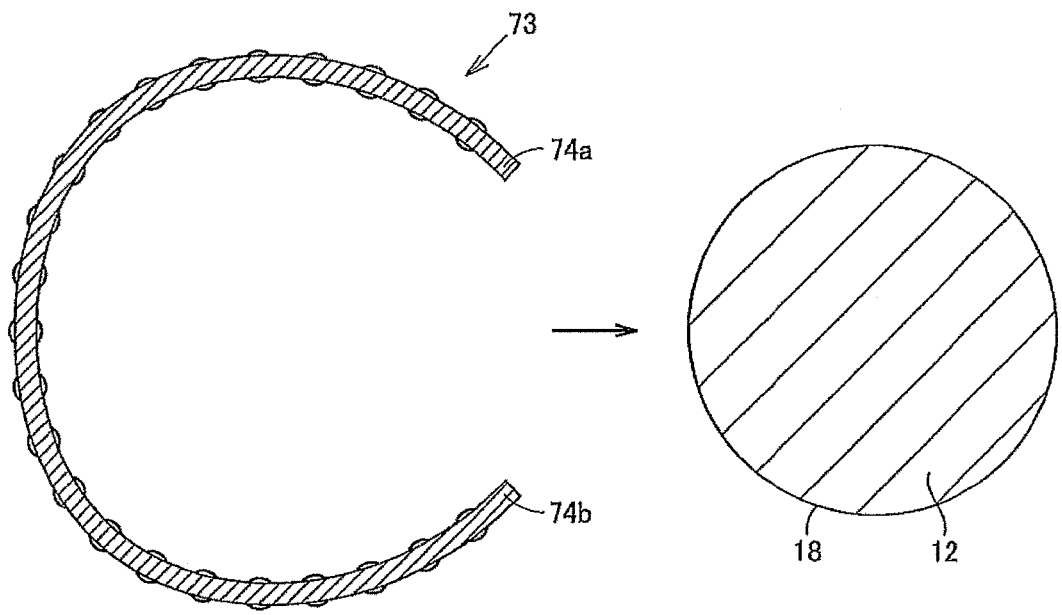
FIG. 20 is a cross-sectional view showing how to mount the cage in FIG. 19 on the crankshaft.

As shown in FIG. 19, a cage 73 retaining needle rollers 23 is made of a single cage member with a plurality of pockets each housing a needle roller. The cage 73 is a single annular cage member cut at any one point in the circumferential direction. As shown in FIG. 20, the cage 73 can be split at any given point in the circumferential direction as if the cage is opened by disengaging its ends 74a, 74b from each other. More specifically, the circumferential ends 74a, 74b are separated away from each other in the directions indicated by arrows $A_5$, $A_6$, respectively, thereby the cage can be mounted on the radially outer surface 18 of the crankshaft 12 from the outside side of the crankshaft 12. The circumferential ends 74a, 74b located in the circumferential direction have a clearance therebetween and therefore are not coupled to each other. The cage member makes orbital motion around the rotation axis in operation of the bearing.

The cage 73 in this embodiment is also configured to function as an inner land riding type or roller riding type. The configuration of the cage to be the inner land riding type or roller riding type have been described in FIGS. 3 and 8. Different from the split cage members shown in FIG. 3 and some other drawings, the cage member in FIG. 19 is a one-piece object; however, the circumferential ends thereof are not coupled, but free, and therefore the cage member behaves in the same manner on both the upper and lower side of the bearing as the split cage member shown in FIG. 3 and other drawings.

The cage can be configured as above. Since the cage functions as a roller riding type or inner land riding type, the cage in this configuration does not abut against the outer ring in operation of the bearing. Therefore, the cage is not strongly pressed against the radially inner surface of the outer ring by centrifugal force, and vibration and noise between the cage and split parts of the split outer ring and the wear of the cage can be eliminated. Furthermore, abrasion powder that causes flaking is not produced, and the cage can smoothly rotate irrespective of roundness of the outer ring and the degree of steps in the split parts. As a result, vibration and noise can be reduced and the life of the bearing can be increased.

Although the cage made of a single member as shown in FIG. 19 is configured to have flat circumferential ends and a clearance between the ends, the present invention is not limited thereto and the cage member can be configured to have engagement portions that can be engaged with each other, at the split section at which the cage is split in the circumferential direction, as shown in FIG. 13 and other drawings described above.

Figure 21:
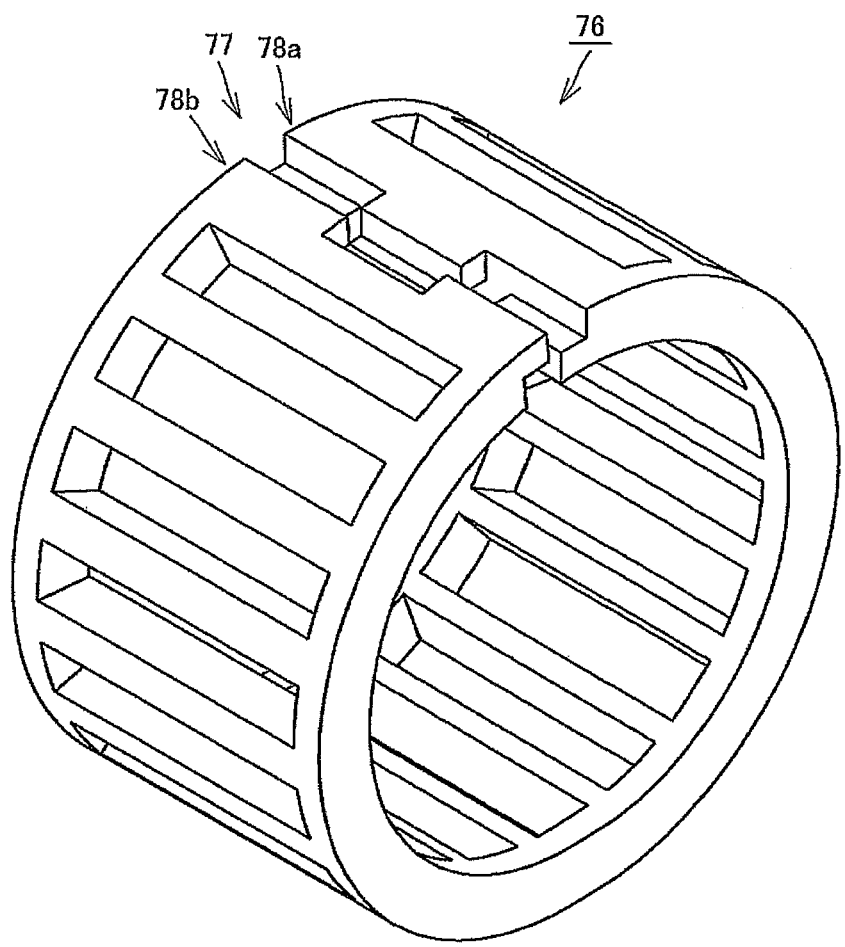
FIG. 21 is a schematic perspective view of a cage provided to a needle roller bearing according to yet another embodiment of the invention.
Figure 22:
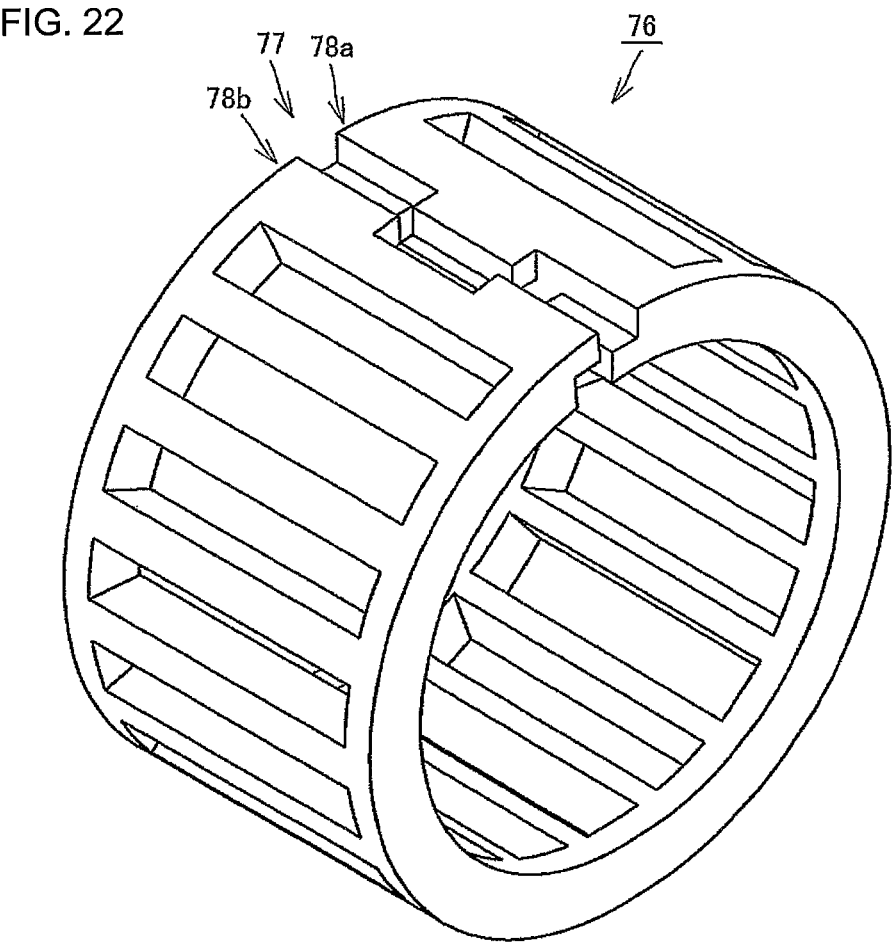
FIG. 22 is a schematic perspective view of a cage provided to a needle roller bearing according to yet another embodiment of the invention.

FIGS. 21 and 22 are schematic perspective views of a cage of a needle roller bearing adopting the aforementioned configuration. FIG. 21 shows the cage with engagement portions engaged with each other, and FIG. 22 shows the cage with the engagement portions not engaged, that is, with the split cage members being separated from each other. In order to provide a clear understanding, roller stoppers and some other parts are not illustrated in FIGS. 21 and 22. FIG. 21 corresponds to FIG. 13, and FIG. 22 corresponds to FIG. 14.

Thus, the cage 76 that has only the single split section 77 can be provided with engagement portions at the respective ends 78a, 78b. The shape of the engagement portions and the specific way of engaging the engagement portions are the same as those described with FIGS. 13 and 14. The cage can be configured as above.

Figure 23:
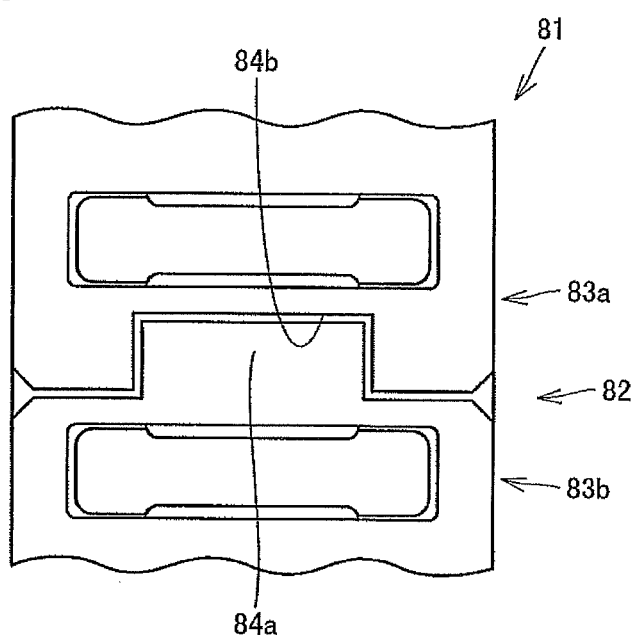
FIG. 23 is a schematic view showing a part of a cage to be provided to a needle roller bearing according to yet another embodiment of the invention.

The engagement portions can be further configured as below. FIG. 23 illustrates a part of the cage included in a needle roller bearing according to the following configuration as viewed from the outer side. Referring to FIG. 23, a cage 81 has circumferential ends 83a, 83b that compose a split section 82. The ends 83a, 83b have a projection 84a projecting in the circumferential direction and a recess 84b recessed in the circumferential direction so as to receive the projection 84a. The projection 84a and recess 84b are configured to have a slight clearance therebetween in the circumferential direction. The cage can be configured as above.

Figure 24:
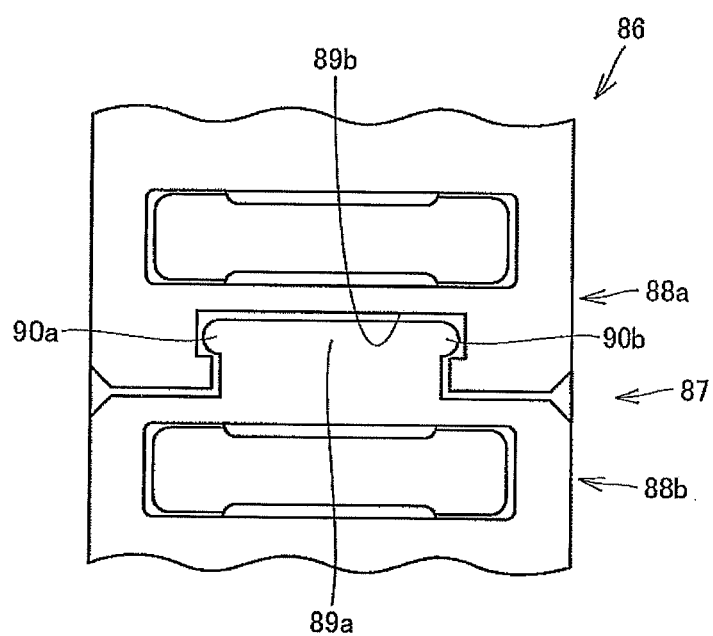
FIG. 24 is a schematic view showing a part of a cage to be provided to a needle roller bearing according to yet another embodiment of the invention.

Referring to FIG. 24, a cage 86 has a circumferential end 88a at a split section 87 and the end 88a has a projection 89a with stick-out portions 90a, 90b that project in the axial direction. The other end 88b of the cage 86 has a receiving recess 89b that is recessed in circumferential direction and axial direction so as to receive the projection 89a and stick-out portions 90a, 90b. The cage 86 can be configured as above. This configuration can more strongly maintain the engagement state. In other words, the movement of the ends split away from each other can be efficiently restricted. In this embodiment, the axial direction denotes the upward/downward direction in the drawing sheet of FIG. 24.

In the above-described embodiments, resin is used as a material of the cage; however, the cage can be formed with metal if it is required to be rigid. Furthermore, the cage may be formed with part resin and part metal.

Additionally, the outer ring is press-formed in the embodiments; however, the outer ring can be machined from a solid material if it is required to be rigid or to have high roundness. In short, the outer ring can be cut out from a single solid metal material. In this case, after the outer ring is subjected to a grinding process, the outer ring may be split by application of impact load.

The cage can be an annular cage made up by combining three or more parts in the circumferential direction. In other words, for example, the cage can be formed with three or more split parts.

Furthermore, needle rollers are used as rolling elements in the above-described embodiments; however, the present invention is not limited thereto and can be applied to, for example, cylindrical rollers and long rollers.

Although the descriptions of the embodiments have been made with a crankshaft support structure supporting a crankshaft, the present invention can be applied to a camshaft support structure supporting a camshaft and a balance shaft support structure supporting a balance shaft.

The foregoing has described the embodiments of the present invention by referring to the drawings. However, the invention should not be limited to the illustrated embodiments. It should be appreciated that various modifications and changes can be made to the illustrated embodiments within the scope of the appended claims and their equivalents.

INDUSTRIAL APPLICABILITY

The needle roller bearing and shaft support structure are advantageously used to meet the demand for enhancement of longevity.

REFERENCE SIGNS LIST 11, 71 crankshaft support structure
12 crankshaft
13 engine block
14 cap
15 rotation axis
16, 17 concave portion
18, 64a, 64b, 69a, 69b radially outer surface
21, 42, 72 needle roller bearing
22 outer ring
23 needle roller
24, 53, 61, 66, 73, 76, 81, 86 cage
25 pocket
26a, 26b, 43a, 43b split outer-ring member
27a, 27b, 35a, 35b, 51a, 51b, 52a, 52b radially inner surface
28a, 28b, 32a, 32b, 55a, 55b, 77, 82, 87 split section
29a, 29b, 30a, 30b, 33a, 33b, 34a, 34b, 63a, 63b, 68a, 68b, 74a, 74b, 78a, 78b,
83a, 83b, 88a, 88b end
31a, 31b, 44a, 44b, 54a, 54b, 62a, 62b, 67a, 67b split cage member
36a, 36b, 37a, 37b, 45a, 45b, 46a, 46b radially inner roller stopper
38a, 38b, 39a, 39b, 47a, 47b, 48a, 48b wall surface
40a, 40b, 41a, 41b, 49a, 49b, 50a, 50b radially outer roller stopper
56a, 57b, 58b, 84a projection
56b, 57a, 58a, 84b recess
65a, 65b chamfer
70a, 70b round portion
90a, 90b stick-out portion.

The invention claimed is:
1. A roller bearing comprising:
a plurality of rollers;
a cage that retains the rollers; and
an outer ring that has a rolling surface on which the rollers roll and is split in a circumferential direction, wherein
the cage includes a split section at which the cage can be split in the circumferential direction,
the cage includes split cage members split by the split section,
the split cage members include radially inner roller stoppers and radially outer roller stoppers to prevent the rollers housed in pockets from falling off,
the radially inner roller stoppers, which are integral with the split cage members and located to face each other, are formed so as to project from an inner side of wall surfaces of a pocket in the circumferential direction,
the radially outer roller stoppers, which are integral with the split cage members and located to face each other, are formed so as to project from an outer side of wall surfaces of a pocket in the circumferential direction,
the radially inner roller stoppers are formed so as to project toward the pocket by an amount more than an amount by which the radially outer roller stoppers project toward the pocket, and the cage is of a roller riding type or an inner land riding type.

2. The roller bearing according to claim 1, wherein the cage can be split at the split section into a plurality of cage members.

3. The roller bearing according to claim 1, wherein the cage members are provided with engagement portions at the split section, the engagement portions being capable of engaging with each other.

4. The roller bearing according to claim 3, wherein each of the cage members has an end provided with a projection extending in the circumferential direction, the end composing one of the engagement portions, and the cage member has another end provided with a recess extending in the circumferential direction to receive the projection, the end composing the other engagement portion.

5. The roller bearing according to claim 4, wherein the projection has stick-out portions extending in the axial direction, and the recess has receiving recesses extending in the axial direction to receive the projection and the stick-out portions.

6. The roller bearing according to claim 1, wherein the ends at the split section have outer surfaces that are sloped radially inward.

7. The roller bearing according to claim 1, wherein the cage is made of resin.

8. The roller bearing according to claim 1, wherein the outer ring is press-formed.

9. A shaft support structure comprising:

a roller bearing according to claim 1; and at least one shaft selected from a crankshaft, a camshaft, and a balance shaft, wherein the shaft is rotatably supported by the roller bearing.

* * * * *